US012437733B2

(12) United States Patent
Ra et al.

(10) Patent No.: US 12,437,733 B2
(45) Date of Patent: Oct. 7, 2025

(54) ELECTRONIC DEVICE INCLUDING NONVOLATILE MEMORY, DISPLAY PANEL AND DISPLAY DRIVER CIRCUIT, AND OPERATING METHOD OF ELECTRONIC DEVICE

(71) Applicant: SAMSUNG ELECTRONICS CO., LTD., Suwon-si (KR)

(72) Inventors: Joongmin Ra, Suwon-si (KR); Sunyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 280 days.

(21) Appl. No.: 18/119,136

(22) Filed: Mar. 8, 2023

(65) Prior Publication Data

US 2024/0021177 A1 Jan. 18, 2024

(30) Foreign Application Priority Data

Jul. 14, 2022 (KR) ........................ 10-2022-0086632

(51) Int. Cl.
*G09G 5/393* (2006.01)

(52) U.S. Cl.
CPC ....... *G09G 5/393* (2013.01); *G09G 2330/021* (2013.01); *G09G 2360/18* (2013.01)

(58) Field of Classification Search
CPC ..................... G09G 2330/021; G09G 2360/18
See application file for complete search history.

(56) References Cited

U.S. PATENT DOCUMENTS

| | | | | |
|---|---|---|---|---|
| 9,317,440 | B2 | 4/2016 | Park et al. | |
| 11,119,561 | B2 | 9/2021 | Hasbun | |
| 11,216,383 | B2 | 1/2022 | Bae et al. | |
| 2012/0311237 | A1 | 12/2012 | Park | |
| 2015/0153965 | A1 | 6/2015 | Park | |
| 2016/0246502 | A1 | 8/2016 | Choi | |
| 2019/0179660 | A1 | 6/2019 | Qui et al. | |
| 2019/0244566 | A1 * | 8/2019 | Kim | G09G 5/02 |
| 2022/0028327 | A1 | 1/2022 | Bae | |

FOREIGN PATENT DOCUMENTS

| | | | |
|---|---|---|---|
| KR | 10-2012-0132820 | A | 12/2012 |
| KR | 10-2017-0099746 | A | 9/2017 |
| KR | 20200140709 | A * | 12/2020 |
| KR | 10-2021-0157585 | A | 12/2021 |

* cited by examiner

*Primary Examiner* — Xin Sheng
(74) *Attorney, Agent, or Firm* — Sughrue Mion, PLLC

(57) ABSTRACT

An electronic device includes a display panel, a nonvolatile memory, and a display driver circuit that includes a frame buffer and a display memory. The electronic device is connected with an external device through a video interface channel, and is connected with the display panel and the nonvolatile memory. In a first mode, the display driver circuit distributes and store data received through the video interface channel in the frame buffer and the display memory, and programs the data distributed and stored in the frame buffer and the display memory in the nonvolatile memory. In a second mode, the display driver circuit loads the data stored in the nonvolatile memory to the display memory, stores frame data received through the video interface channel in the frame buffer, generates compensated frame data by compensating for the frame data by using the data, and sends the compensated frame data to the display panel.

19 Claims, 13 Drawing Sheets

ELECTRONIC DEVICE INCLUDING NONVOLATILE MEMORY, DISPLAY PANEL AND DISPLAY DRIVER CIRCUIT, AND OPERATING METHOD OF ELECTRONIC DEVICE

CROSS-REFERENCE TO RELATED APPLICATION(S)

This application claims priority under 35 U.S.C. § 119 to Korean Patent Application No. 10-2022-0086632 filed on Jul. 14, 2022, in the Korean Intellectual Property Office, the disclosure of which is incorporated by reference herein in its entirety.

BACKGROUND

The present disclosure relates to an electronic device, and more particularly, relate to an electronic device including a nonvolatile memory, a display panel, and a display driver circuit and supporting a write operation for the nonvolatile memory and an operating method of the electronic device.

A display panel displays image data such that the user is able to recognize the image data. For example, the display panel may include pixels displaying different colors and may display an image by adjusting the brightness of the pixels. The display panel may select a row of pixels targeted for brightness adjustment by using a gate line and adjust the brightness of the pixels by using source lines.

As a time during which the pixels of the display panel display an image elapses, the stress may be accumulated in the pixels. The accumulated stress of the pixels may make the brightness of the pixels different. For example, even when image data of the same brightness level are displayed, the brightness of the pixels may be differently displayed depending on an accumulated stress difference.

To compensate for the change in brightness of pixels due to the stress, there may be used compensation data including stress information of the pixels. The influence of the stress applied to the pixels may be compensated by correcting brightness levels of image data, which are transferred to the pixels based on the stress of the pixels, based on configuration data.

SUMMARY

Embodiments of the present disclosure provide an electronic device supporting an operation of writing a large amount of data including compensation data in a nonvolatile memory and an operating method of the electronic device.

According to an aspect of an embodiment, an electronic device includes: a display panel; a nonvolatile memory; and a display driver circuit connected with the display panel and the nonvolatile memory and configured to be connected with an external device through a video interface channel, and connected with the display panel and the nonvolatile memory, the display driver circuit including a frame buffer and a display memory, wherein the display driver circuit is further configured to, in a first mode: distribute and store data, received through a video interface channel, in the frame buffer and the display memory, and program the data distributed and stored in the frame buffer and the display memory in the nonvolatile memory, and wherein the display driver circuit is further configured to, in a second mode: load the data stored in the nonvolatile memory to the display memory, store frame data, received through the video interface channel in the frame buffer, generate compensated frame data by compensating for the frame data by using the data, and send the compensated frame data to the display panel.

According to an aspect of an embodiment, an electronic device includes: a display panel; a nonvolatile memory; and a display driver circuit connected with the display panel and the nonvolatile memory and configured to be connected with an external device through a video interface channel, the display driver circuit including a display memory, wherein the display driver circuit is configured to, in a first mode: store data, received through the video interface channel from an external device, in the display memory, and program the data stored in the display memory in the nonvolatile memory, and wherein the display driver circuit is configured to, in a second mode: load the data stored in the nonvolatile memory to the display memory, generate compensated frame data by compensating for frame data received through the video interface channel by using the data, and send the compensated frame data to the display panel.

According to an aspect of an embodiment, an operating method of an electronic device which includes a display panel, a nonvolatile memory, and a display driver circuit, includes: distributing and storing, at the display driver circuit, data received from an external device through a video interface channel in at least two separated internal memories in a first mode; programming, at the display driver circuit, the data distributed and stored in the at least two separated internal memories in the nonvolatile memory in the first mode; loading, at the display driver circuit, the data stored in the nonvolatile memory to at least one memory among the at least two separated internal memories in a second mode; receiving, at the display driver circuit, frame data from an external other device in the second mode; generating, at the display driver circuit, compensated frame data by compensating for the frame data by using the data loaded to the at least one memory in the second mode; and sending, at the display driver circuit, the compensated frame data to the display panel in the second mode.

According to an aspect of an embodiment, a display driver circuit includes: a frame buffer; a nonvolatile memory controller configured to control an external nonvolatile memory; driver circuits configured to be connected with an external display panel; a display memory; and a video interface channel configured to be connected with an external device, wherein the display driver circuit is configured to, in a first mode: distribute and store first data received through the video interface channel in the frame buffer and the display memory, and send the first data distributed and stored in the frame buffer and the display memory to the external nonvolatile memory through the nonvolatile memory controller, and wherein the display driver circuit is further configured to, in a second mode: load second data received from the external nonvolatile memory through the nonvolatile memory controller to the display memory, store frame data received through the video interface channel in the frame buffer, generate compensated frame data by compensating for the frame data by using the second data, and send the compensated frame data to a display panel through the driver circuits.

BRIEF DESCRIPTION OF THE FIGURES

The above and other aspects and features of the present disclosure will become apparent by describing in detail embodiments thereof with reference to the accompanying drawings, in which.

DETAILED DESCRIPTION

Below, embodiments of the present disclosure will be described in detail and clearly to such an extent that an ordinary one in the art easily implements the present disclosure.

Figure 1:
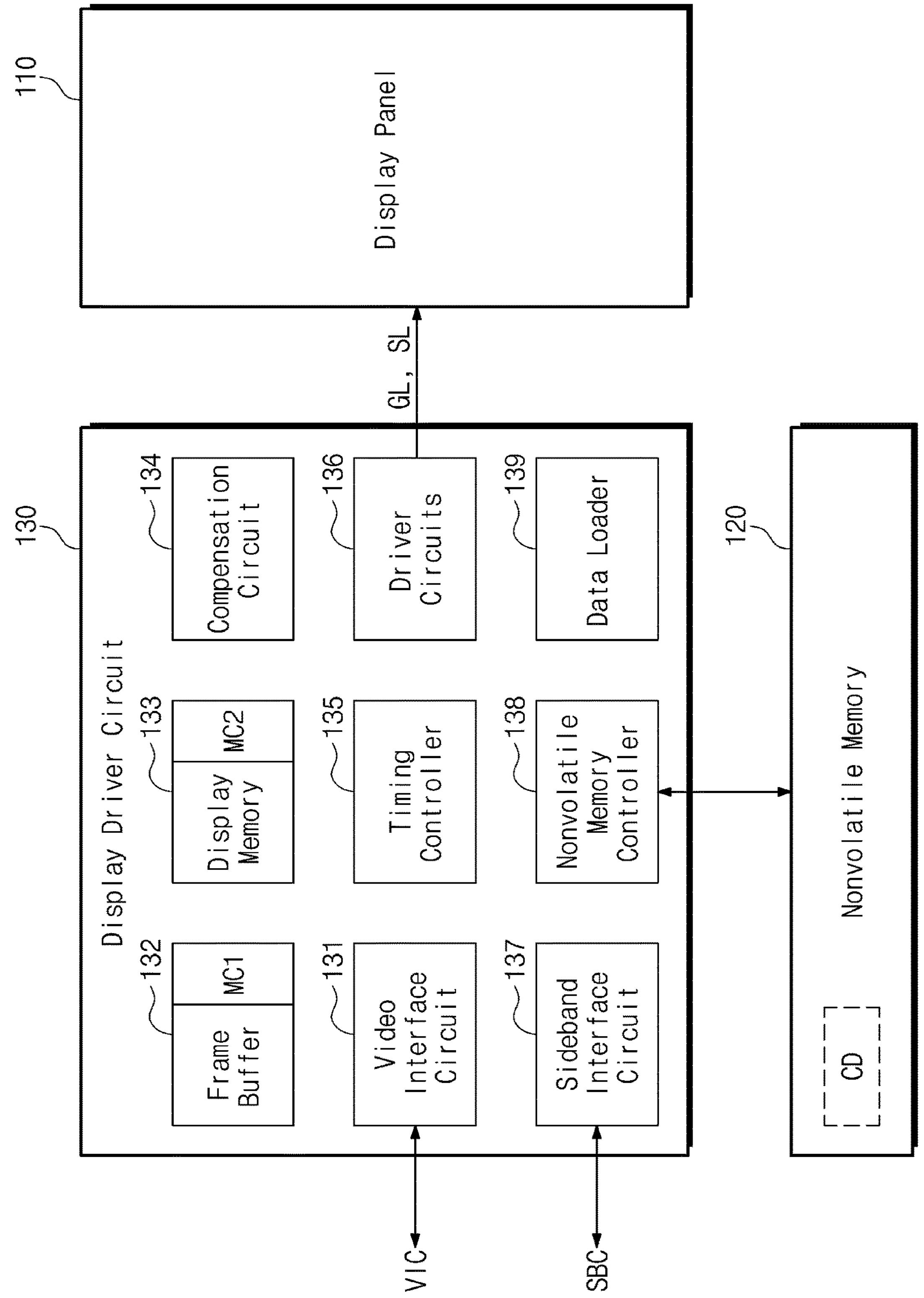
FIG. 1 is a diagram illustrating an electronic device according to an embodiment of the present disclosure.

FIG. 1 is a diagram illustrating an electronic device 100 according to an embodiment of the present disclosure. Referring to FIG. 1, the electronic device 100 may include a display panel 110, a nonvolatile memory 120, and a display driver circuit 130.

The display panel 110 may include pixels (not illustrated) arranged in rows and columns. The rows of the pixel may be connected with gate lines GL and the columns of the pixels may be connected with source lines SL. The pixels may display various colors such as a blue color, a green color, and a red color and may display an image through combinations of the various colors such as a blue color, a green color, and a red color.

The nonvolatile memory 120 may be used to store compensation data CD, for example, initial compensation data or backup compensation data. The compensation data CD may be used to compensate for the change in brightness of the pixels of the display panel 110 due to the stress. The nonvolatile memory 120 may include one of various nonvolatile memories such as a flash memory, a phase-change memory, a ferroelectric memory, and a magnetic memory.

The display driver circuit 130 may communicate with an external device through a video interface channel VIC and may communicate with an external other device through a sideband channel SBC. The display driver circuit 130 may access the compensation data CD stored in the nonvolatile memory 120 and may be connected with the display panel 110 through the gate lines GL and the source lines SL. The display driver circuit 130 may display an image by using the display panel 110.

The display driver circuit 130 may include a video interface circuit 131, a frame buffer 132, a first memory controller MC1, a display memory 133, a second memory controller MC2, a compensation circuit 134, a timing controller 135, driver circuits 136, a sideband interface circuit 137, a nonvolatile memory controller 138, and a data loader 139.

The video interface circuit 131 may communicate with the external device through the video interface channel VIC. For example, the video interface circuit 131 may communicate with the external device external device based on the MIPI (Mobile Industry Processor Interface) C-PHY or D-PHY. C-PHY may also be referred to as C-PHY interface or C-PHY physical layer. D-PHY may also be referred to as D-PHY interface or D-PHY physical layer.

The frame buffer 132 may be used to store data received through the video interface channel VIC from the external device (e.g., a processor) providing frame data. The frame buffer 132 may include a random access memory such as a static random access memory (SRAM) or a dynamic random access memory (DRAM).

The first memory controller MC1 may control the frame buffer 132. Depending on a request of any other component (e.g., the video interface circuit 131, the compensation circuit 134, or the data loader 139) of the display driver circuit 130, the first memory controller MC1 may write data in the frame buffer 132 or may read data from the frame buffer 132.

The display memory 133 may be used to store the compensation data CD that are used by the compensation circuit 134. For example, the compensation data CD that are read from the nonvolatile memory 120 may be stored in the display memory 133. Also, the display memory 133 may be used to store data received through the video interface channel VIC. The display memory 133 may include a random access memory such as a static random access memory (SRAM) or a dynamic random access memory (DRAM). The display memory 133 may be a memory that is physically separated from the frame buffer 132.

The second memory controller MC2 may control the display memory 133. Depending on a request of any other component (e.g., the video interface circuit 131, the compensation circuit 134, or the data loader 139) of the display driver circuit 130, the second memory controller MC2 may write data in the display memory 133 or may read data from the display memory 133.

The compensation circuit 134 may read the compensation data CD from the display memory 133 and may read the frame data from the frame buffer 132. The compensation circuit 134 may compensate for the frame data by using the compensation data CD read from the display memory 133. For example, the compensation circuit 134 may compensate for brightness levels to be displayed through the pixels of the display panel 110. The compensation circuit 134 may provide the compensated frame data to the sideband interface circuit 137.

The timing controller 135 may adjust operation timings of the display driver circuit 130. For example, the timing controller 135 may control timings such where the driver circuits 136 sequentially select the gate lines GL. The timing controller 135 may control the timing when the driver circuits 136 adjust voltages to be applied to the source lines SL.

The driver circuits 136 may include a gate driver that sequentially selects the gate lines GL under control of the timing controller 135. The gate driver may sequentially select the gate lines GL in a direction from the uppermost gate line to the lowermost gate line. After the lowermost gate line is selected, the gate driver may again select the uppermost gate line.

The driver circuits 136 may include a source driver that adjusts voltages of the source lines SL under control of the timing controller 135. The source driver may adjust voltages of the source lines SL based on the compensated frame data transferred from the compensation circuit 134, for example, data corresponding to the currently selected gate line from among the compensated frame data. The brightness of pixels connected with the currently selected gate line may change depending on the change in the voltages of the source lines SL.

The sideband interface circuit 137 may communicate with the external device through the sideband channel SBC. The sideband interface circuit 137 may be based on the protocol that is different from the protocol of the video interface circuit 131. For example, the sideband interface circuit 137 may communicate with the external device based on the protocol such as TAG (Joint Test Action Group) or GPIO (General Purpose Input Output).

The nonvolatile memory controller 138 may control the nonvolatile memory 120. For example, under control of the display driver circuit 130, the nonvolatile memory controller 138 may read data from the nonvolatile memory 120 and may load (or store) the read data to (or in) the display memory 133. In response to a request of the data loader 139, the nonvolatile memory controller 138 may read data from the frame buffer 132 and the display memory 133 and may write the read data in the nonvolatile memory 120.

The nonvolatile memory controller 138 may manage a mapping table that is used to translate an address received from any other component of the display driver circuit 130 into a physical address of the nonvolatile memory 120. The mapping table may be managed in a dedicated memory inside or outside the nonvolatile memory controller 138.

In a specific mode, the data loader 139 may access the frame buffer 132 through the first memory controller MC1 and may access the display memory 133 through the second memory controller MC2. Also, in the specific mode, the data loader 139 may access the nonvolatile memory 120 through the nonvolatile memory controller 138. The data loader 139 may support a high-capacity write operation for the nonvolatile memory 120 by using the frame buffer 132 and the display memory 133.

Figure 2:
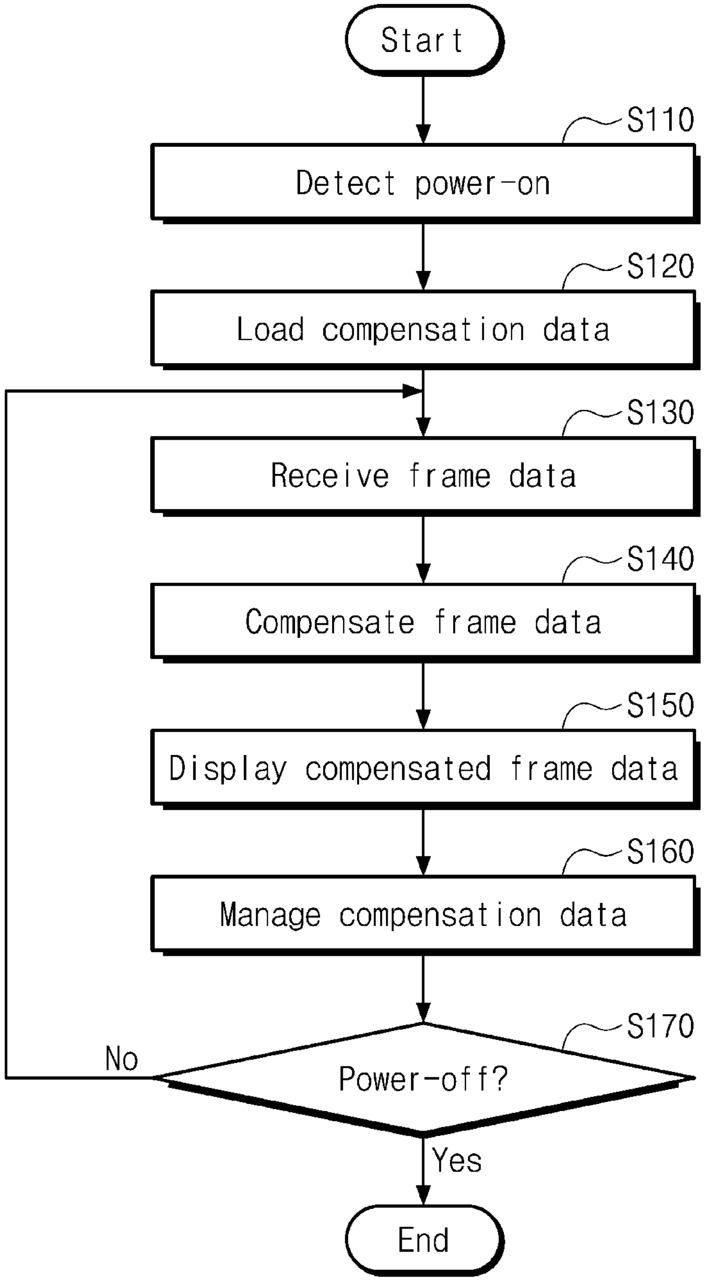
FIG. 2 is a diagram illustrating an example of a method where an electronic device operates in an operation mode according to an embodiment.
Figure 3:
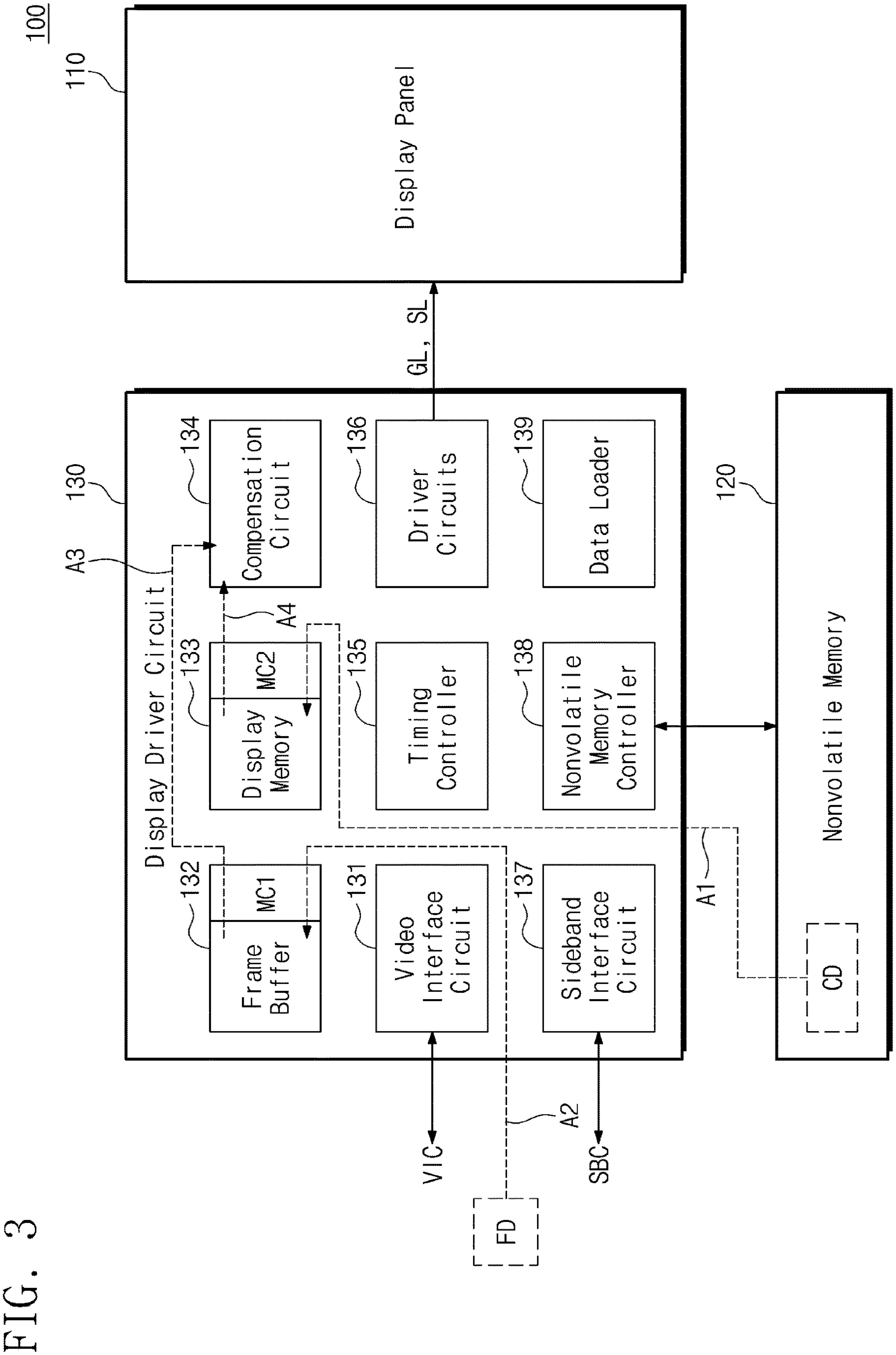
FIG. 3 is a diagram illustrating an example where data are transferred in an electronic device when a method of FIG. 2 is performed.

FIG. 2 is a diagram illustrating an example of a method where the electronic device 100 operates in an operation mode according to an embodiment. FIG. 3 is a diagram illustrating an example where data are transferred in the electronic device 100 when the method of FIG. 2 is performed. Referring to FIGS. 2 and 3, in operation S110, the electronic device 100 may detect a power-on event. For example, as the power is supplied, the electronic device 100 may detect the power-on event and may perform initialization.

In operation S120, the display driver circuit 130 may load the compensation data CD. For example, as marked by a first arrow A1, the nonvolatile memory controller 138 may read the compensation data CD from the nonvolatile memory 120. The nonvolatile memory controller 138 may store the read compensation data CD in the display memory 133 through the second memory controller MC2. For example, it may be considered that the operation of reading the compensation data CD from the nonvolatile memory 120 and storing the compensation data CD in the display memory 133 is included in the initialization operation of the electronic device 100.

In operation S130, the display driver circuit 130 may receive frame data FD. As marked by a second arrow A2, the video interface circuit 131 may receive the frame data FD from the external device (e.g., a processor providing the frame data FD) through the video interface channel VIC. The video interface circuit 131 may store the received frame data FD in the frame buffer 132 through the first memory controller MC1.

In operation S140, the display driver circuit 130 may compensate for the frame data FD. For example, as marked by a third arrow A3, the compensation circuit 134 may read data (e.g., line data) to be output to pixels connected with the currently selected gate line GL from among the frame data FD stored in the frame buffer 132 (through the first memory controller MC1). As marked by a fourth arrow A4, the compensation circuit 134 may read compensation data (e.g., line compensation data), which correspond to the line data read (or to be read), from among the compensation data CD stored in the display memory 133 (through the second memory controller MC2).

The compensation circuit 134 may compensate for the line data by using the line compensation data. For example, the compensation circuit 134 may adjust brightness values of the line data by using the line compensation data. The line compensation data (or the compensation data CD) may include an offset value for brightness adjustment, a calculation equation for calculating a brightness level, or history information of pixels for calculating a brightness level.

In operation S150, the electronic device 100 may display the compensated frame data. For example, the compensation circuit 134 may transfer the compensated frame data to the source driver of the driver circuits 136. The source driver of the driver circuits 136 may output the compensated frame data to the display panel 110 through the source lines SL. For example, the source driver of the driver circuits 136 may adjust voltages of the source lines SL based on the compensated frame data. As the voltages of the source lines SL are adjusted, the display panel 110 may adjust the brightness of the pixels.

In operation S160, the display driver circuit 130 may manage the compensation data CD. For example, as the compensated frame data are displayed as an image through the display panel 110, the stress may be accumulated in the pixels. The display driver circuit 130 may update the compensation data CD such that there is applied the stress accumulated in the pixels. In an embodiment, when outputting the frame data to the display panel 110 or periodically (or at time periods), the display driver circuit 130 may update the compensation data CD.

The display driver circuit 130 may back the updated compensation data CD up to the nonvolatile memory 120. When outputting the frame data to the display panel 110 or periodically (or at time periods), the display driver circuit 130 may back the compensation data CD up. In an embodiment, the time period at which the display driver circuit 130 updates the compensation data CD may be equal to or different from the time period at which the display driver circuit 130 backs the compensation data CD up.

In operation S170, the electronic device 100 may determine whether a power-off event occurs. When it is determined that the power-off event occurs, the electronic device 100 may terminate the operation. When it is determined that the power-off event does not occur, the electronic device 100 may repeat operation S130 to operation S150 (and operation S160). For example, within a refresh rate that that the electronic device 100 supports, the electronic device 100 may repeat operation S130 to operation S150 based on the refresh rate at which the frame data FD are received.

Figure 4:
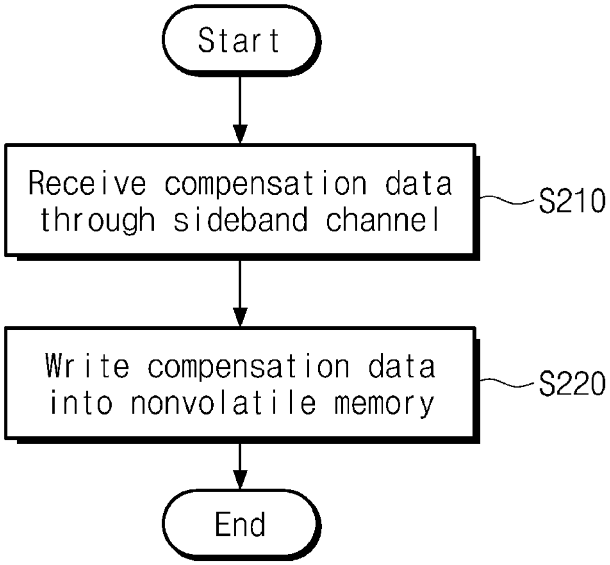
FIG. 4 is a diagram illustrating an example of a method where an electronic device operates in an operation mode according to another embodiment.
Figure 5:
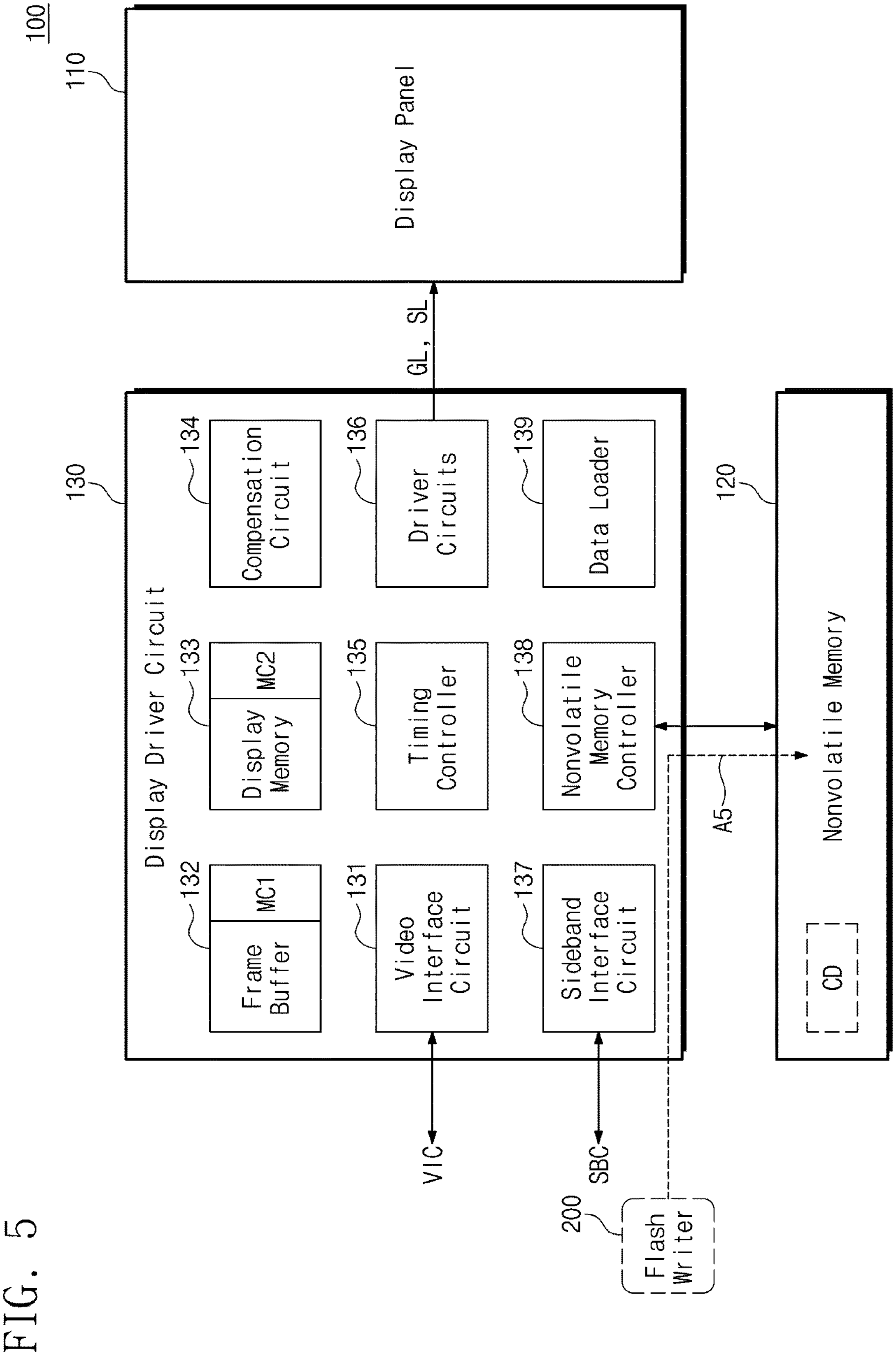
FIG. 5 is a diagram illustrating an example where data are transferred in an electronic device when a method of FIG. 4 is performed.

FIG. 4 is a diagram illustrating an example of a method where the electronic device 100 operates in an operation mode according to another embodiment. FIG. 5 is a diagram illustrating an example where data are transferred in the electronic device 100 when the method of FIG. 4 is performed. Referring to FIGS. 4 and 5, in operation S210, the display driver circuit 130 may receive compensation data through a sideband channel. For example, as marked by a fifth arrow A5, the sideband interface circuit 137 may receive the compensation data CD and an address from the external device, for example, a flash writer 200 through the sideband channel SBC. The compensation data CD may be initial compensation data.

In operation S220, the display driver circuit 130 may store the received compensation data in the nonvolatile memory 120. For example, as marked by the fifth arrow A5, the compensation data CD and the address received through the sideband interface circuit 137 may be transferred to the nonvolatile memory controller 138. The nonvolatile memory controller 138 may program the compensation data CD in the nonvolatile memory 120. For example, the nonvolatile memory controller 138 may translate the address into a physical address of the nonvolatile memory 120. The nonvolatile memory controller 138 may write the compensation data CD in the nonvolatile memory 120 based on the translated physical address.

As described above, the compensation data CD may be written in the nonvolatile memory 120 through the flash writer 200 connected with the sideband channel SBC. However, a separate writer (e.g., the flash writer 200) is required to write the compensation data CD in the nonvolatile memory 120 through the sideband channel SBC. When there is no flash writer 200, it may be impossible to write the compensation data CD in the nonvolatile memory 120 and to replace or update the compensation data CD written in the nonvolatile memory 120.

This makes it difficult for a manufacturer manufacturing a system including the electronic device 100 to manufacture the system by using the electronic device 100 or causes an increase in costs necessary to manufacture the system. The manufacturer may be, for example, an integrator purchases that semiconductor chip components from a semiconductor chip vendor. For example, when the manufacturer manufacturing the system intends to write, replace, or update the compensation data CD based on the characteristic associated with how the electronic device 100 is used in the system, the manufacturer should contact another company that has the flash writer 200 or should purchase the flash writer 200.

Figure 6:
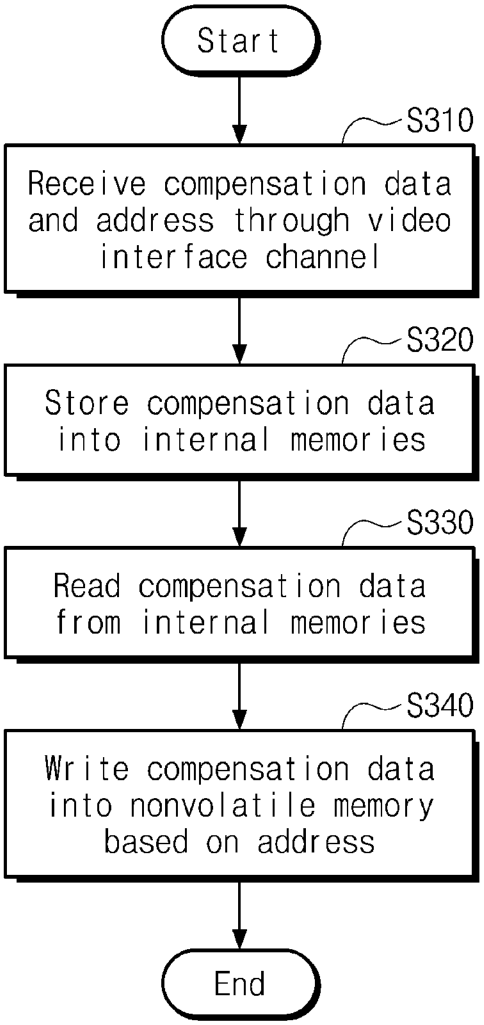
FIG. 6 is a diagram illustrating an example of a method where an electronic device operates in an operation mode according to another embodiment.
Figure 7:
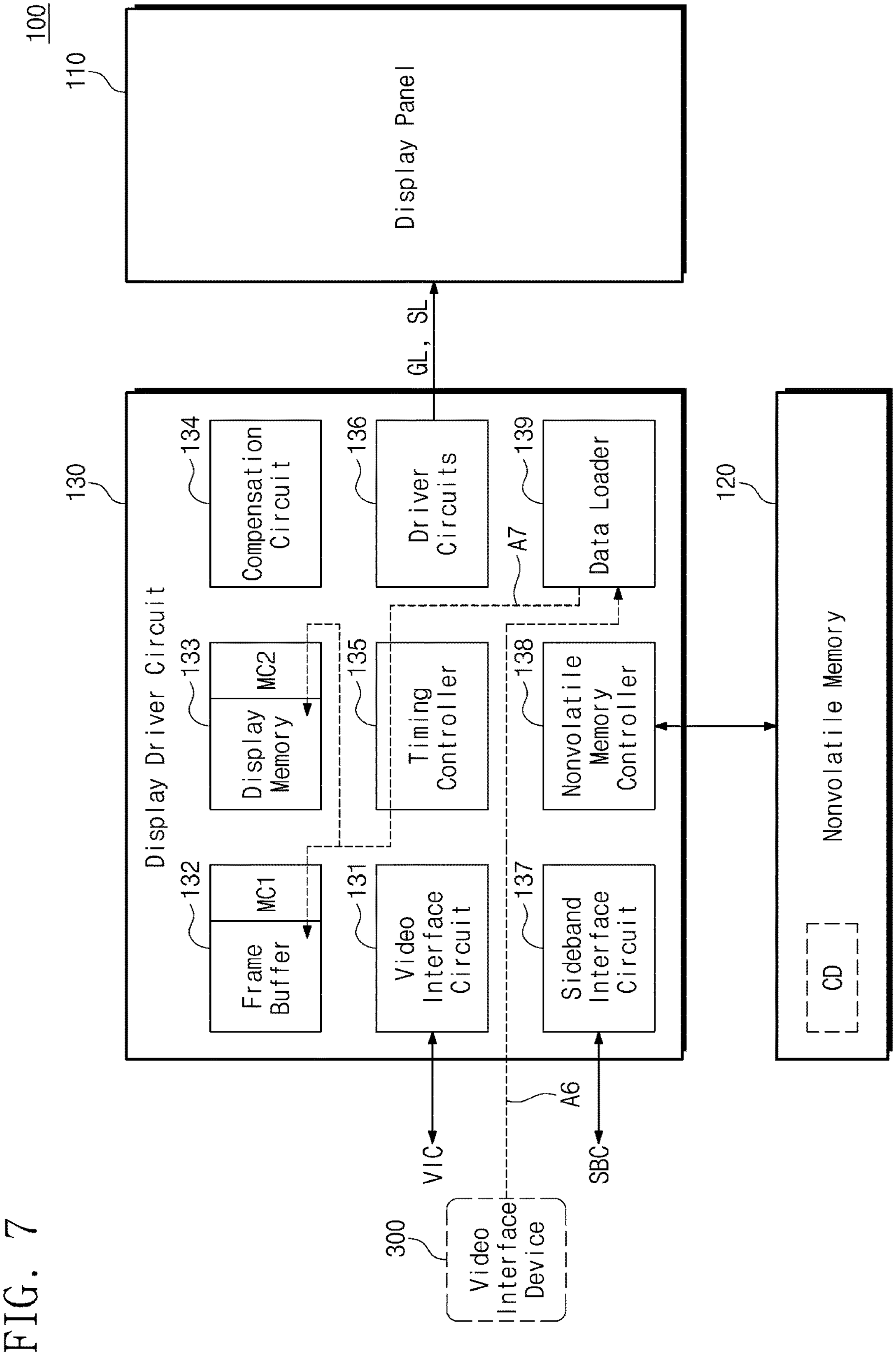
FIGS. 7 and 8 are diagrams illustrating an example where data are transferred in an electronic device when a method of FIG. 6 is performed.
Figure 8:
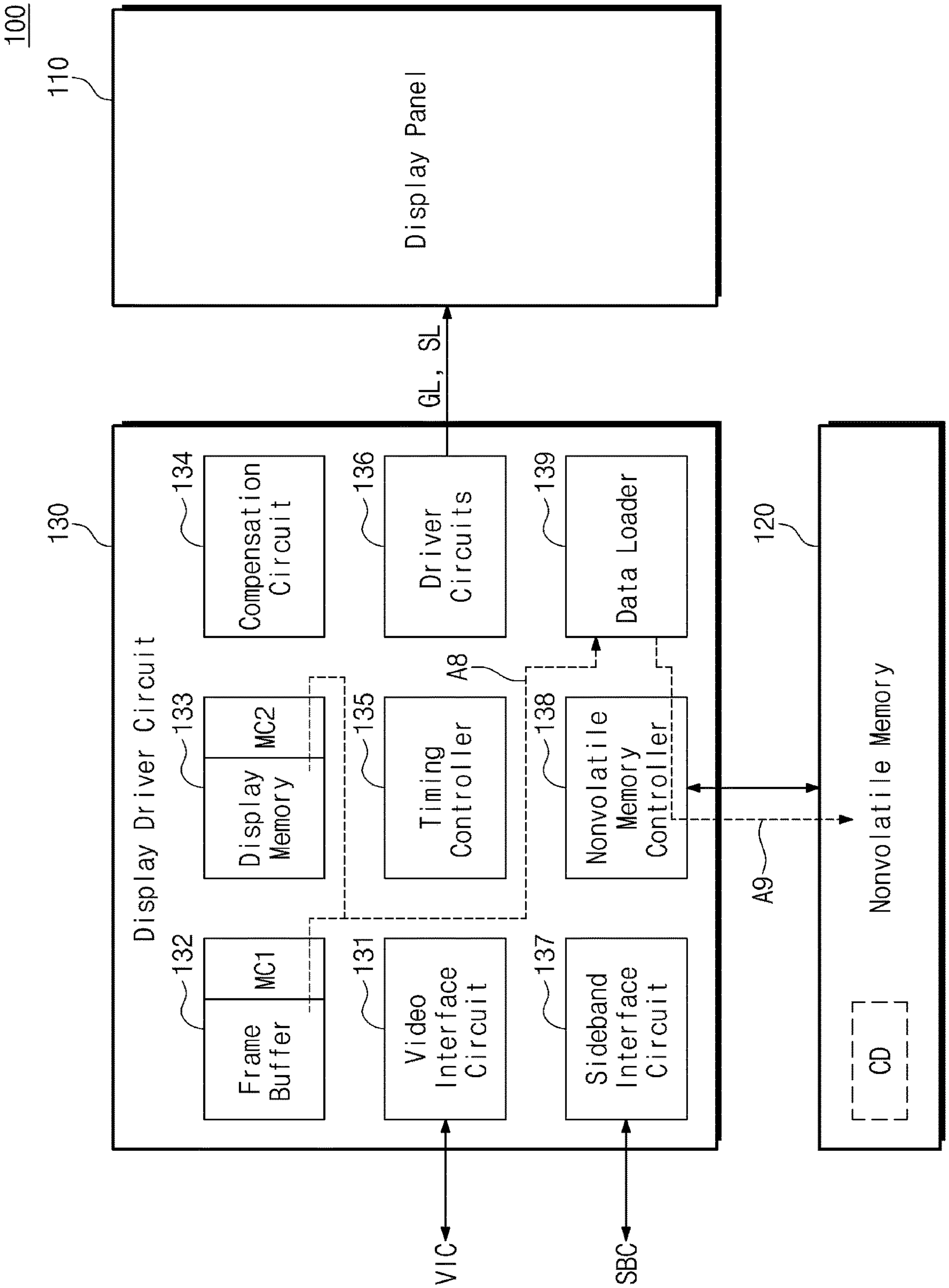

FIG. 6 is a diagram illustrating an example of a method where the electronic device 100 operates in an operation mode according to another embodiment. FIGS. 7 and 8 are diagrams illustrating an example where data are transferred in the electronic device 100 when the method of FIG. 6 is performed. Referring to FIGS. 6 and 7, in operation S310, the electronic device 100 may receive the compensation data CD and the address through the video interface channel VIC. For example, as marked by a sixth arrow A6, the video interface circuit 131 of the display driver circuit 130 may receive the compensation data CD and the address from the external device, for example, a video interface device 300 capable of communicating through the video interface channel VIC. The video interface circuit 131 may transfer the compensation data CD and the address to the data loader 139.

In operation S320, the display driver circuit 130 may store the received compensation data CD in internal memories. For example, as marked by a seventh arrow A7, the data loader 139 may distribute and store the compensation data CD in the frame buffer 132 and the display memory 133. Regardless of the address received together with the compensation data CD, the data loader 139 may distribute and store the compensation data CD in the frame buffer 132 and the display memory 133 based on an internally generated address. The data loader 139 may include a counter (e.g., an address counter) for generating an address internally. The data loader 139 may store the address received together with the compensation data CD in one of the frame buffer 132 and the display memory 133.

The data loader 139 may store a portion of the compensation data CD in the frame buffer 132 through the first memory controller MC1 and may store the remaining portion of the compensation data CD in the display memory 133 through the second memory controller MC2.

Referring to FIGS. 6 and 8, in operation S330, the display driver circuit 130 may read the compensation data CD from the internal memories. In an embodiment, as marked by an eighth arrow A8, the data loader 139 may read the compensation data CD and the address, which are distributed and stored in the frame buffer 132 and the display memory 133, from the frame buffer 132 and the display memory 133. As described above, the compensation data CD may be distributed and stored in the frame buffer 132 and the display memory 133, while the address may be stored in one of the frame buffer 132 and the display memory 133. The data loader 139 may read a portion of the compensation data CD from the frame buffer 132 through the first memory controller MC1 and may read the remaining portion of the compensation data CD from the display memory 133 through the second memory controller MC2. The data loader 139 may read the address received together with the compensation data CD from one of the frame buffer 132 and the display memory 133.

In operation S340, the display driver circuit 130 may write the compensated data in the nonvolatile memory 120 based on the address. In an embodiment, as marked by a ninth arrow A9, the data loader 139 may transfer the compensation data CD and the address (i.e., the address received together with the compensation data CD) to the nonvolatile memory controller 138. The nonvolatile memory controller 138 may write the compensation data CD in the nonvolatile memory 120 based on the address.

As described above, the display driver circuit 130 according to an embodiment of the present disclosure may distribute and store the compensation data CD in the internal memories (i.e., the frame buffer 132 and the display memory 133) and may write the distributed and stored compensation data CD in the nonvolatile memory 120. Because the internal memories of the display driver circuit 130 are integrally used, the buffering capacity of the display driver circuit 130 may increase, and the amount of compensation data CD capable of being written in the nonvolatile memory 120 simultaneously may increase at a time. Accordingly, the high-capacity write operation for the nonvolatile memory 120 through the video interface channel VIC is supported.

In an embodiment, the high-capacity write operation described with reference to FIGS. 6, 7, and 8 may be performed plural times. Data that are larger in size than a virtual address range VR may be written in the nonvolatile memory 120 by input data to the display driver circuit 130 through the video interface channel VIC plural times while varying the address. In this case, the high-capacity write operation that is supported according to an embodiment of the present disclosure may be more useful.

Also, a portion of data stored in the nonvolatile memory 120 may be updated or replaced by adjusting an address and inputting data smaller in size than the virtual address range VR to the display driver circuit 130.

How compensation data are written in the nonvolatile memory 120 is described with reference to FIGS. 2 to 8 as an example. However, data that are written in the nonvolatile memory 120 may be data including the compensation data CD. Data that are written in the nonvolatile memory 120 may include various kinds of data for setting the electronic device 100, in addition to the compensation data CD. Data that are written in the nonvolatile memory 120 may include different versions of compensation data capable of being selectively used depending on the use environment of the electronic device 100.

In an embodiment, the display driver circuit 130 may include an additional compensation circuit for performing the compensation operation different in kind from that of the compensation circuit 134. Also, the display driver circuit 130 may further include an additional display memory and an additional memory controller, which correspond to the additional compensation circuit. In this case, the data loader 139 may distribute and store the data including the compensation data CD in the frame buffer 132, the display memory 133, and the additional display memory; afterwards, the distributed and stored data may be written in the nonvolatile memory 120.

In an embodiment, the display driver circuit 130 may further include additional circuits participating in the operation of the electronic device 100, and an additional display memory and an additional memory controller that correspond to the additional circuits. In this case, the data loader 139 may distribute and store the data including the compensation data CD in the frame buffer 132, the display memory 133, and the additional display memory; afterwards, the distributed and stored data may be written in the nonvolatile memory 120.

Figure 9:
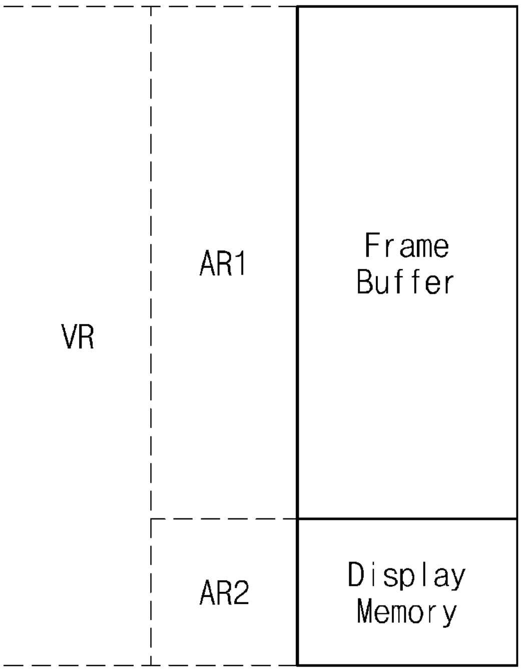
FIG. 9 is a diagram illustrating an example where a display driver circuit manages a frame buffer and a display driver circuit, according to an embodiment of the present disclosure.

FIG. 9 is a diagram illustrating an example where the display driver circuit 130 manages the frame buffer 132 and the display driver circuit 130, according to an embodiment of the present disclosure. Referring to FIGS. 1 and 9, the frame buffer 132 may include physical addresses corresponding to a first address range AR1. The display memory 133 may include physical addresses corresponding to a second address range AR2.

In an embodiment, the first address range AR1 and the second address range AR2 may be independent of each other. Values of some physical addresses among the physical addresses of the first address range AR1 may be identical to values of some physical addresses among the physical addresses of the second address range AR2. As another example, the number of bits of each physical address of the first address range AR1 may be different from the number of bits of each physical address of the second address range AR2.

The data loader 139 may manage the frame buffer 132 and the display memory 133 based on a memory map. The data loader 139 may generate a memory mapped virtual address range AR corresponding to all the addresses of the frame buffer 132 and the display memory 133. The virtual address range AR may include virtual addresses respectively corresponding to the physical addresses of the first address range AR1 and the physical addresses of the second address range AR2.

The data loader 139 may generate and maintain a mapping table mapping the virtual addresses of the virtual address range VR and the physical addresses of the first address range AR1 and the second address range AR2. The mapping table may be stored in the data loader 139, in the frame buffer 132, in the display memory 133, or in any other memory of the display driver circuit 130.

The data loader 139 may select a target storage location of the data including the compensation data CD by using the virtual addresses of the virtual address range VR and may translate virtual addresses into physical addresses by using the mapping table. The data loader 139 may distribute and store the data including the compensation data CD in the frame buffer 132 and the display memory 133, based on the translated physical addresses.

In an embodiment, in the case where the display driver circuit 130 includes two or more display memories, the virtual address range VR may correspond to address ranges of the frame buffer and the two or more display memories. The data loader 139 may manage a mapping table corresponding to the frame buffer and the two or more display memories.

Figure 10:
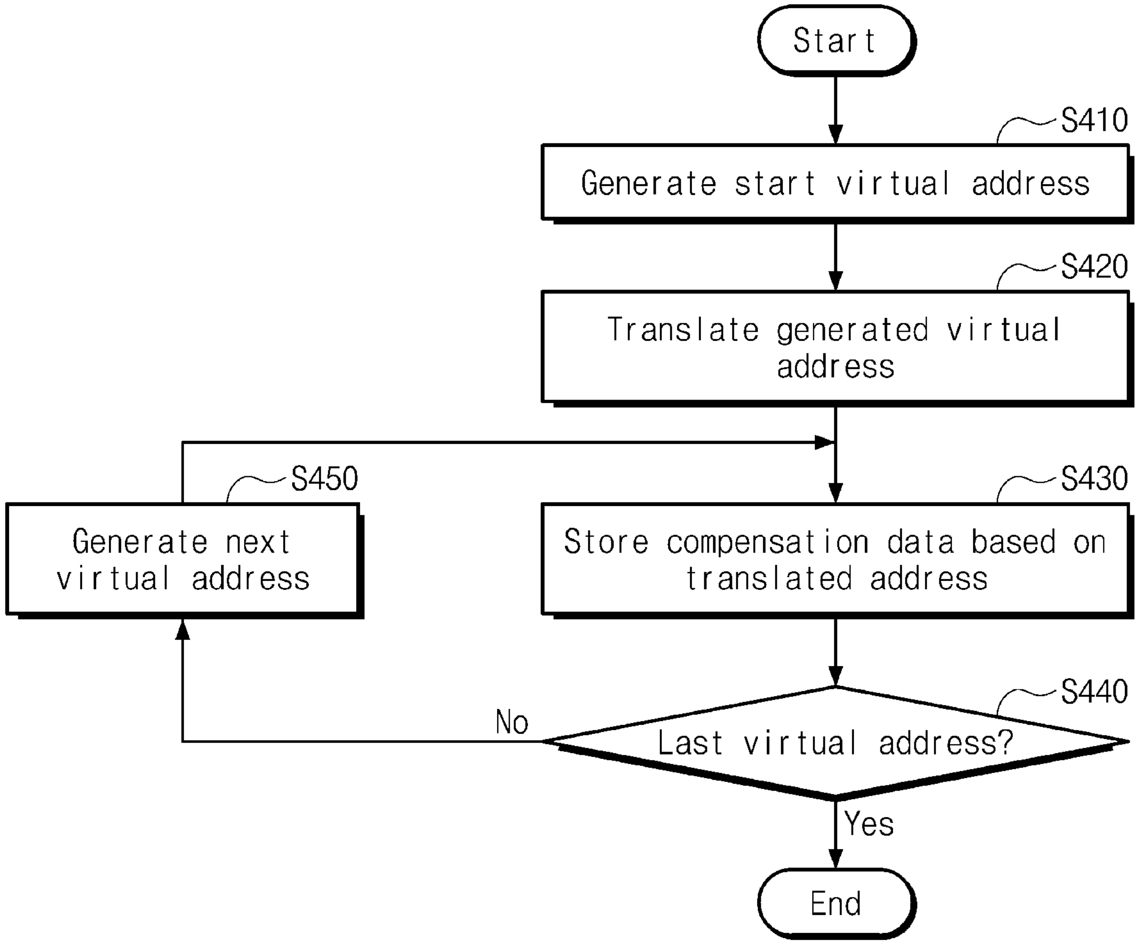
FIG. 10 is a diagram illustrating an example of a process where a data loader distributes and stores data including compensation data transferred from a video interface circuit in a frame buffer and a display memory.

FIG. 10 is a diagram illustrating an example of a process where the data loader 139 distributes and stores data including the compensation data CD transferred from the video interface circuit 131 in the frame buffer 132 and the display memory 133. Referring to FIGS. 1, 9, and 10, in operation S410, the data loader 139 may generate a start virtual address of the virtual address range VR.

In operation S420, the data loader 139 may translate the generated virtual address into a physical address by using a mapping table. The physical address may correspond to the first address range AR1 or the second address range AR2.

In operation S430, the data loader 139 may store partial data among the data including the compensation data CD (e.g., partial data corresponding to a write unit of the frame buffer 132 or the display memory 133) in a region of the frame buffer 132 or the display memory 133, which corresponds to the translated physical address.

In operation S440, the data loader 139 may determine whether the generated virtual address is the last address. For example, the data loader 139 may determine whether the generated virtual address is the last virtual address of the virtual address range VR (e.g., whether a free space is present in the virtual address range VR) or whether the generated virtual address is the last virtual address at which the partial data are to be stored (e.g., whether the partial data are completely stored because there is no more data to be stored).

When it is determined that the generated virtual address is not the last virtual address, in operation S450, the data loader 139 may generate a next virtual address. For example, the data loader 139 may generate the next virtual address by increasing the current virtual address as much as the write unit of the frame buffer 132 or the display memory 133. Afterwards, the data loader 139 may again perform operation S430.

When it is determined that the generated virtual address is the last virtual address, the partial data may be completely stored. Accordingly, the data loader 139 may terminate the generation of the virtual address. In an embodiment, the data loader 139 may include an address counter configured to count a virtual address.

An operation where the data loader 139 reads the data including the compensation data CD from the frame buffer 132 and the display memory 133 is identical to the operation described with reference to FIG. 10 except that the storing of the compensation data CD in operation S430 is modified to read the compensation data CD. Thus, additional description will be omitted to avoid redundancy.

Figure 11:
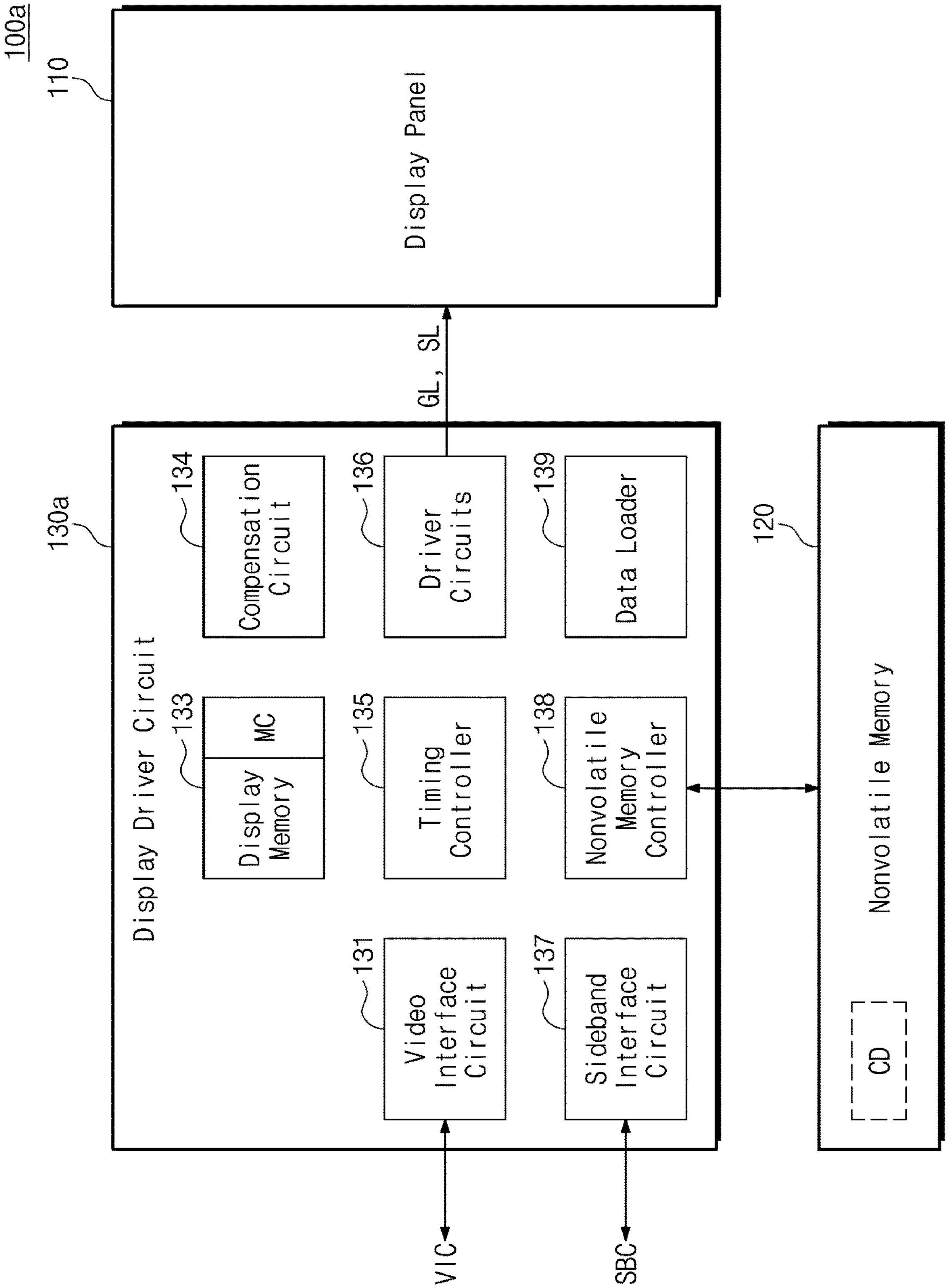
FIG. 11 is a diagram illustrating an electronic device according to another embodiment of the present disclosure.

FIG. 11 is a diagram illustrating an electronic device 100*a* according to another embodiment of the present disclosure. Referring to FIG. 11, the electronic device 100*a* may include the display panel 110, the nonvolatile memory 120, and a display driver circuit 130*a*.

The display driver circuit 130*a* may include the video interface circuit 131, the display memory 133, a memory controller MC, the compensation circuit 134, the timing controller 135, the driver circuits 136, the sideband interface circuit 137, the nonvolatile memory controller 138, and the data loader 139.

Compared to the electronic device 100 of FIG. 1, the frame buffer 132 and the first memory controller MC1 may not be provided in the display driver circuit 130*a* of the electronic device 100*a*. The second memory controller MC2 of FIG. 1 may be named the memory controller MC.

In the operation mode described with reference to FIGS. 2 and 3, frame data received through the video interface channel VIC may be directly transferred to the compensation circuit 134 in the on-the-fly manner.

In the operation mode described with reference to FIGS. 6, 7, and 8, the data loader 139 may store data including the compensation data CD in the display memory 133. The data loader 139 may manage a mapping table that is used to map virtual addresses and physical addresses of the display memory 133.

As described above, according to an embodiment of the present disclosure, even in the case where the frame buffer 132 is not provided in the display driver circuit 130*a*, it is possible to write the data including the compensation data CD in the nonvolatile memory 120 by using the display memory 133.

In an embodiment, the display driver circuit 130 may include an additional compensation circuit for performing the compensation operation different in kind from that of the compensation circuit 134. Also, the display driver circuit 130 may further include an additional display memory and an additional memory controller, which correspond to the additional compensation circuit. In this case, the data loader 139 may distribute and store the data including the compensation data CD in the display memory 133 and the additional display memory; afterwards, the distributed and stored data may be written in the nonvolatile memory 120.

In an embodiment, the display driver circuit 130 may further include additional circuits participating in the operation of the electronic device 100, and an additional display memory and an additional memory controller that correspond to the additional circuits. In this case, the data loader 139 may distribute and store the data including the compensation data CD in the display memory 133 and the additional display memory; afterwards, the distributed and stored data may be written in the nonvolatile memory 120.

Unless otherwise stated explicitly, the characteristics of the present disclosure described with reference to FIGS. 1 to 10 may be identically applied to the electronic device 100*a* of FIG. 11.

Figure 12:
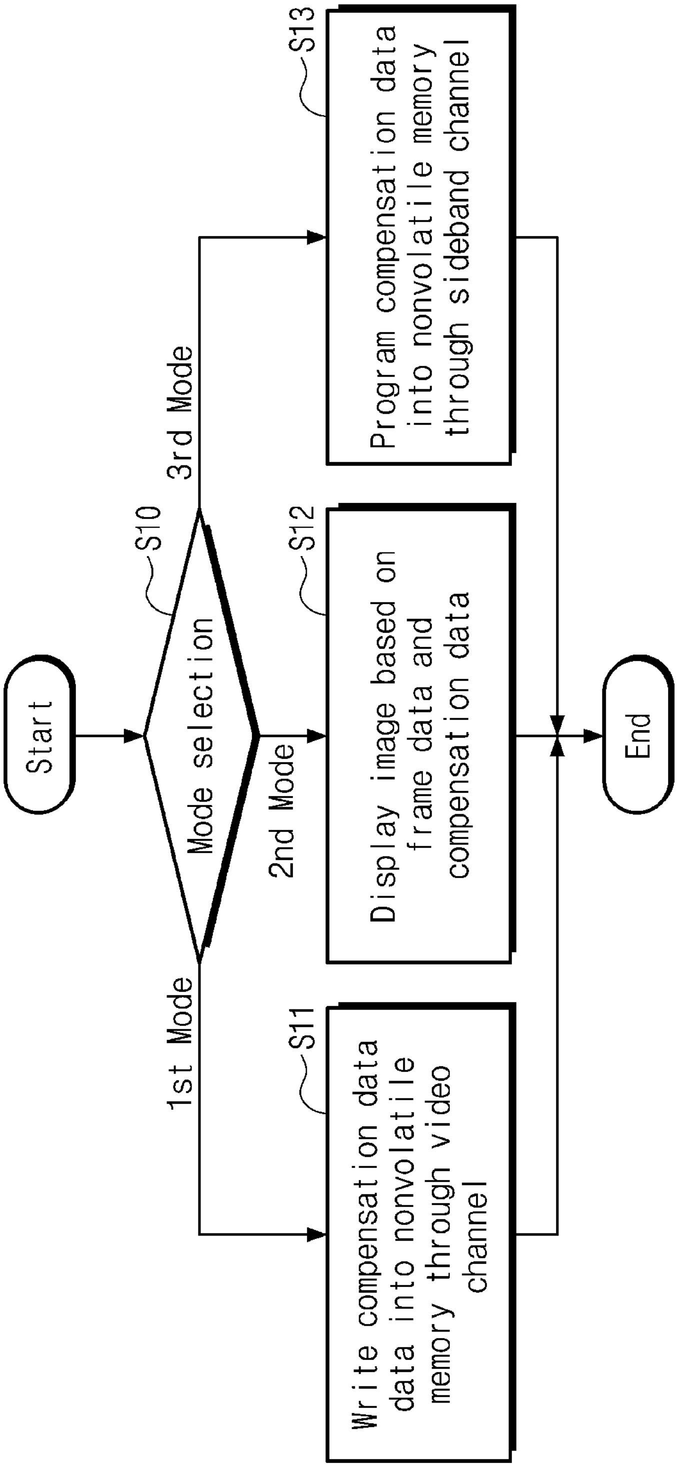
FIG. 12 is a diagram illustrating an example where operation modes of an electronic device according to an embodiment of the present disclosure are selected.

FIG. 12 is a diagram illustrating an example where operation modes of the electronic device 100 or 100*a* according to an embodiment of the present disclosure are selected. Referring to FIGS. 1, 11, and 12, in operation S10, mode selection of the electronic device 100*a* may be performed.

The electronic device 100 or 100*a* may enter a first mode in response to that the display driver circuit 130 or 130*a* receives a signal indicating the first mode or in response to detecting that the display driver circuit 130 or 130*a* is connected with the video interface device 300. In the first mode (S11), the display driver circuit 130 or 130*a* may write the compensation data CD (e.g., data including the compensation data CD) received through the video interface channel VIC in the nonvolatile memory 120. The first mode may correspond to the operation mode described with reference to FIGS. 6, 7, and 8.

The electronic device 100 or 100*a* may enter a second mode in response to that the display driver circuit 130 or 130*a* receives a signal indicating the second mode or in response to detecting that the display driver circuit 130 or 130*a* is connected with a device (e.g., a processor) sending the frame data. In the second mode (S12), the display driver circuit 130 or 130*a* may display an image through the display panel 110, based on frame data received through the video interface channel VIC and the compensation data CD loaded from the nonvolatile memory 120. The second mode may correspond to the operation mode described with reference to FIGS. 2 and 3.

The electronic device 100 or 100*a* may enter a third mode in response to that the display driver circuit 130 or 130*a* receives a signal indicating the third mode or in response to detecting that the display driver circuit 130 or 130*a* is connected with the flash writer 200. In the third mode (S13), the display driver circuit 130 or 130*a* may write the compensation data CD (e.g., data including the compensation data CD) received through the sideband channel SBC in the nonvolatile memory 120. The third mode may correspond to the operation mode described with reference to FIGS. 4 and 5.

As described above, the electronic device 100 or 100*a* according to an embodiment of the present disclosure may operate in one of the first mode, the second mode, and the third mode. In particular, in the first mode, the electronic device 100 or 100*a* may support the high-capacity write operation for the nonvolatile memory 120 by integrally using the internal memories. Accordingly, it may be easy to write data in the nonvolatile memory 120.

Figure 13:
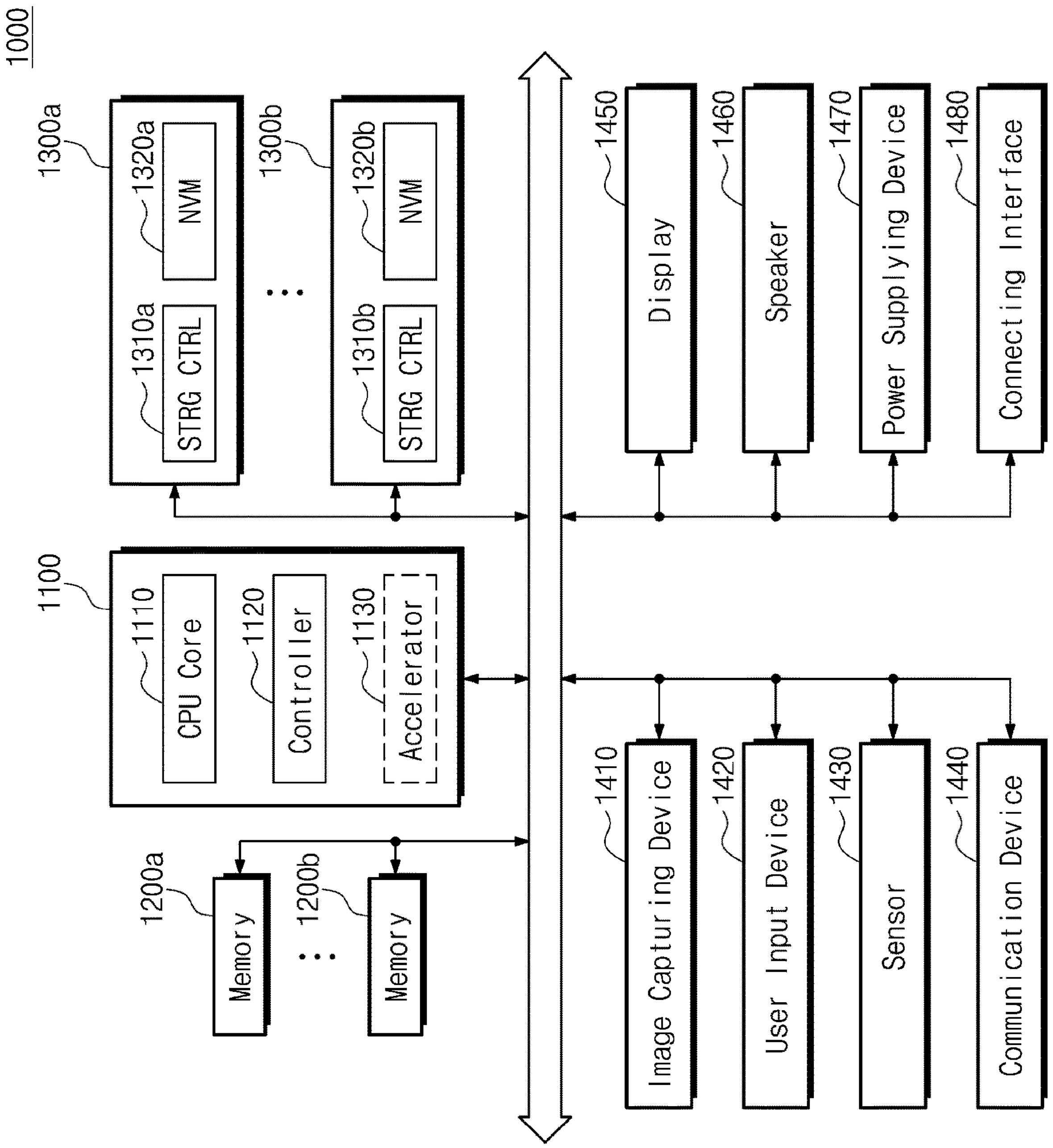
FIG. 13 is a diagram illustrating a system according to an embodiment of the present disclosure.

FIG. 13 is a diagram of a system 1000 to which a storage device is applied, according to an embodiment. The system 1000 of FIG. 13 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 13 is not necessarily limited to the mobile system and may be a PC, a laptop computer, a server, a media player, or an automotive device (e.g., a navigation device).

Referring to FIG. 13, the system 1000 may include a main processor 1100, memories (e.g., 1200*a* and 1200*b*), and storage devices (e.g., 1300*a* and 1300*b*). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* and 1200*b* and/or the storage devices 1300*a* and 1300*b*. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* and 1200*b* may be used as main memory devices of the system 1000. Although each of the memories 1200*a* and 1200*b* may include a volatile memory, such as static random access memory (SRAM) and/or dynamic RAM (DRAM), each of the memories 1200*a* and 1200*b* may include non-volatile memory, such as a flash memory, phase-change RAM (PRAM) and/or resistive RAM (RRAM). The memories 1200*a* and 1200*b* may be implemented in the same package as the main processor 1100.

The storage devices 1300*a* and 1300*b* may serve as non-volatile storage devices configured to store data regardless of whether power is supplied thereto, and have larger storage capacity than the memories 1200*a* and 1200*b*. The storage devices 1300*a* and 1300*b* may respectively include storage controllers (STRG CTRL) 1310*a* and 1310*b* and NVM (Non-Volatile Memory)s 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, the NVMs 1320*a* and 1320*b* may include other types of NVMs, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of solid-state devices (SSDs) or memory cards and be removably combined with other components of the system 1000 through an interface, such as the connecting interface 1480 that will be described below. The storage devices 1300*a* and 1300*b* may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

In an embodiment, the electronic device 100 described with reference to FIGS. 1 to 12 may be included in the display 1450.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to the present disclosure, a display driver circuit may distribute and store data in two or more memories included therein and may write the distributed and stored data in a nonvolatile memory. Accordingly, an electronic device supporting a high-capacity write operation and an operating method of the electronic device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:

a display panel;

a nonvolatile memory; and a display driver circuit connected with the display panel and the nonvolatile memory and configured to be connected with an external device through a video interface channel, and connected with the display panel and the nonvolatile memory, the display driver circuit comprising a frame buffer and a display memory, wherein the display driver circuit is further configured to, in a first mode:

distribute and store data, received through the video interface channel, in the frame buffer and the display memory, and program the data distributed and stored in the frame buffer and the display memory in the nonvolatile memory, and wherein the display driver circuit is further configured to, in a second mode:

load the data stored in the nonvolatile memory to the display memory, store frame data, received through the video interface channel in the frame buffer, generate compensated frame data by compensating for the frame data by using the data, and send the compensated frame data to the display panel, wherein the display driver circuit is configured to be connected with another external device through a sideband channel.

2. The electronic device of claim 1, wherein the display driver circuit is further configured to manage the frame buffer and the display memory based on a memory map.

3. The electronic device of claim 1, wherein the frame buffer and the display memory are physically separated from each other.

4. The electronic device of claim 1, wherein the display driver circuit comprises:

a first memory controller corresponding to the frame buffer; and a second memory controller corresponding to the display memory.

5. The electronic device of claim 1, wherein the display memory comprises at least two memories physically separated from each other.

6. The electronic device of claim 5, wherein the display driver circuit further comprises at least two memory controllers respectively corresponding to the at least two memories.

7. The electronic device of claim 1, wherein the display driver circuit is further configured to support programming of data, a size of which corresponds to a sum of a first capacity of the frame buffer and a second capacity of the display memory, in the nonvolatile memory at a time.

8. The electronic device of claim 1, wherein the display driver circuit is further configured to, in a third mode, program data, received through the sideband channel from the another external device, in the nonvolatile memory.

9. The electronic device of claim 1, wherein the sideband channel comprises a Joint Test Action Group (JTAG) channel or a General Purpose Input Output (GPIO) channel.

10. The electronic device of claim 1, wherein the video interface channel comprises a MIPI (Mobile Industry Processor Interface) C-PHY interface or a MIPI D-PHY interface.

11. The electronic device of claim 1, wherein, in the first mode, the data is received together with an address, and wherein the display driver circuit is further configured to, in the first mode, program the data in the nonvolatile memory based on the address.

12. The electronic device of claim 11, wherein the display driver circuit is further configured to distribute and store the data in the frame buffer and the display memory based on an internally generated address, regardless of the address.

13. The electronic device of claim 12, wherein the display driver circuit is further configured to:

generate a virtual address;

translate the virtual address into a translated address of one of the frame buffer and the display memory; and store the data in one of the frame buffer and the display memory based on the translated address.

14. The electronic device of claim 13, wherein the display driver circuit further comprises an address counter configured to generate the virtual address increasing or decreasing continuously.

15. An electronic device comprising:

a display panel;

a nonvolatile memory; and a display driver circuit connected with the display panel and the nonvolatile memory and configured to be connected with an external device through a video interface channel, the display driver circuit comprising a display memory, wherein the display driver circuit is configured to, in a first mode:

store data, received through the video interface channel from the external device, in the display memory, and program the data stored in the display memory in the nonvolatile memory, and wherein the display driver circuit is configured to, in a second mode:

load the data stored in the nonvolatile memory to the display memory, generate compensated frame data by compensating for frame data received through the video interface channel by using the data, and send the compensated frame data to the display panel, wherein the display driver circuit is configured to be connected with another external device through a sideband channel.

16. The electronic device of claim 15, wherein the display memory comprises at least two memories physically separated from each other, and wherein the display driver circuit further comprises at least two memory controllers respectively corresponding to the at least two memories.

17. The electronic device of claim 16, wherein the display driver circuit is further configured to manage the at least two memories based on memory map.

18. The electronic device of claim 15, wherein the display driver circuit is further configured to, in a third mode, program data received through the sideband channel in the nonvolatile memory.

19. An operating method of an electronic device which includes a display panel, a nonvolatile memory, and a display driver circuit, the operating method comprising:

distributing and storing, at the display driver circuit, data received from an external device through a video interface channel in at least two separated internal memories in a first mode;

programming, at the display driver circuit, the data distributed and stored in the at least two separated internal memories in the nonvolatile memory in the first mode;

loading, at the display driver circuit, the data stored in the nonvolatile memory to at least one memory among the at least two separated internal memories in a second mode;

receiving, at the display driver circuit, frame data from an external other device in the second mode;

generating, at the display driver circuit, compensated frame data by compensating for the frame data by using the data loaded to the at least one memory in the second mode; and sending, at the display driver circuit, the compensated frame data to the display panel in the second mode, wherein the display driver circuit is configured to be connected with another external device through a side-band channel.

* * * * *